United States Patent
Garcia (10) Patent No.: US 11,583,903 B2
(45) Date of Patent: Feb. 21, 2023

(54) VALVE FLUSH APPARATUS AND METHOD

(71) Applicant: John Garcia, Murray, UT (US)

(72) Inventor: John Garcia, Murray, UT (US)

( * ) Notice: Subject to any disclaimer, the term of this patent is extended or adjusted under 35 U.S.C. 154(b) by 114 days.

(21) Appl. No.: 17/307,249

(22) Filed: May 4, 2021

(65) Prior Publication Data

US 2021/0387240 A1 Dec. 16, 2021

Related U.S. Application Data

(60) Provisional application No. 63/049,430, filed on Jul. 8, 2020.

(51) Int. Cl.
  *B08B 9/032* (2006.01)
  *F16K 51/00* (2006.01)

(52) U.S. Cl.
  CPC ............ *B08B 9/0321* (2013.01); *F16K 51/00* (2013.01)

(58) Field of Classification Search
  CPC .............................. F16K 51/00; B08B 9/0321
  See application file for complete search history.

(56) References Cited

U.S. PATENT DOCUMENTS

| | | | | |
|---|---|---|---|---|
| 4,344,576 A | * | 8/1982 | Smith | B05B 15/50 239/570 |
| 4,414,999 A | * | 11/1983 | Basta | A61M 39/225 137/601.19 |
| 5,355,618 A | * | 10/1994 | Pedersen | A01G 9/247 239/553.3 |
| 6,263,901 B1 | * | 7/2001 | Lohde | F16K 31/402 251/30.02 |
| 7,004,677 B1 | * | 2/2006 | Ericksen | A01G 25/162 137/364 |
| 2005/0067015 A1 | * | 3/2005 | McKeague | E03B 9/14 137/299 |
| 2005/0189506 A1 | * | 9/2005 | Lee | F16K 31/402 251/30.01 |
| 2005/0230650 A1 | * | 10/2005 | Peterson | F16L 19/0218 251/148 |
| 2007/0075162 A1 | * | 4/2007 | McKeague | E03B 9/14 239/104 |
| 2009/0101143 A1 | * | 4/2009 | Frimann | B63C 11/186 128/201.27 |
| 2014/0014202 A1 | * | 1/2014 | Keren | F16K 7/17 137/510 |

* cited by examiner

*Primary Examiner* — Kevin R Barss
(74) *Attorney, Agent, or Firm* — Sam IP Legal Solutions, P.C.; Ryan D. Sam (57) ABSTRACT

A valve flush apparatus includes a rigid base designed to removably attach to a body of an irrigation valve. A stem extends outwardly from the base and away from the body of the irrigation valve and may be centrally located on the base. The stem and an aperture in the base may define a water passageway through which water may flow through the body of the irrigation valve and through the valve flush apparatus. A hose may also be included which removably attaches to the stem so as to extend the water passageway of the valve flush apparatus. A method includes flushing a clogged irrigation valve through use of the valve flush apparatus.

20 Claims, 7 Drawing Sheets

VALVE FLUSH APPARATUS AND METHOD

RELATED APPLICATIONS

This application claims priority to U.S. Provisional Application Ser. No. 63/049,430, filed Jul. 8, 2020.

BACKGROUND OF THE INVENTION

Irrigation systems are known in the art. A common type of irrigation system used in both residential and commercial settings is a below-ground automatic irrigation system. This type of system often includes a controller, pipe and tubing, irrigation valves, a backflow preventor and sprinkler heads which are often spaced apart into different zones. The controller is the "brains" of the system and sends signal to the irrigation valves directing the valves when to open and when to close. Generally, one irrigation valve controls one zone of sprinkler heads. The irrigation valves open and close according to the signal they receive from the controller. The sprinkler heads are activated, sprinkling water over a given area, and deactivated according to the opening and closing of the irrigation valves. Irrigation valves are generally contained within a valve box which is generally buried in the ground with the lid of the valve box at ground level such that the lid can be opened without having to remove grass, dirt, and/or other material to expose the lid.

These type of irrigation systems are very convenient and useful in keeping a given area or terrain irrigated. However, as with most systems and machines in our world, these irrigation systems require tune-up and repair from time to time. Generally, it is a good idea to inspect, tune-up and repair irrigation systems at the beginning of each irrigating season.

Accordingly, there has been an ongoing need for improvements and advances in methods, systems and tools of irrigation system repair. Therefore, new methods, systems and tools used to tune-up and repair irrigation systems would be well received by irrigation system contractors and the general public who use, maintain and service irrigation systems.

SUMMARY OF THE INVENTION

Various embodiments of an apparatus for flushing irrigation valves and related methods are disclosed. The valve flush apparatus may have a base, a hollow stem and a water passageway which extends through the base and the hollow stem. The valve flush apparatus may be configured to be removably secured to a rim of a body of an irrigation valve such that the base is in contact with the rim of the body of the irrigation valve with a hollow stem extending away from the irrigation valve. In this configuration, a water passageway is formed from the irrigation valve, through the rim of the irrigation valve, through the base, and through the hollow stem. When a water source is turned on that feeds the irrigation valve, water will run through the water passageway and out of a top end of the hollow stem.

The valve flushed apparatus may also have a flexible hose. The flexible hose may be removably secured to the hollow stem such that the water passageway is extended from the end of the hollow stem, through the flexible hose and through a far end of the flexible hose. The base and the hollow stem may be molded together as one piece. Alternatively, the base and hollow stem may be two separate pieces such that the hollow stem may be removably secured to the base.

The base may have a top planar surface, a bottom planar surface, and a thickness between the top planar surface and the bottom planar surface. When removably secured to the rim of the body of the irrigation valve, the bottom planar surface of the base may be in contact with the rim of the body of the irrigation valve. Alternatively, the base may have a gasket attached to the bottom planar surface such that when the valve flush apparatus is removably secured to the rim of the body of the irrigation valve the gasket is between the bottom planar surface of the base and the rim of the body of the irrigation valve such that a hermetic seal is created between the bottom planar surface and the rim. Alternatively, the gasket may be a separate component of the valve flush apparatus.

The base may further have a plurality of apertures extending vertically through the base. The plurality of apertures may be configured to align with a plurality of screw apertures of the body of the irrigation valve. In this configuration, the valve flush apparatus may be removably secured to the body of the irrigation valve through the use of screws.

The hollow stem may be tapered such that the hollow stem has a larger diameter at the top planar surface of the base and a smaller diameter at the top end of the stem such that the diameter of the stem gradually decreases going from the portion of the stem proximate to the top planar surface of the base to the top end of the stem. Similarly, the water passageway through the base may be funneled such that a diameter of the water passageway at the bottom planar surface of the base is larger than a diameter of the water passageway at the top planar surface of the base such that the water passageway gradually decreases from the bottom planar surface of the base to the top planar surface of the base. In this configuration, the water passageway of the base and the hollow stem may gradually decrease in diameter from the bottom planar surface of the base to the top end of the hollow stem.

A method of clearing debris from an irrigation valve is also disclosed. The method may have a number of steps which may include a step of determining whether a water supply to the sprinkler valve is turned off and if it is not, turning off the water supply to the sprinkler valve. A next step may be disassembling the irrigation valve by removing all parts of the irrigation valve such that a body of the irrigation valve is connected to an incoming irrigation line and an outgoing irrigation line in isolation. A next step may be removably attaching a valve flush apparatus to the body of the irrigation valve such that a water passageway is created from the body of the irrigation valve and through the valve flush apparatus. A next step may be turning on the water supply such that water runs through the body of the irrigation valve and through the valve flush apparatus. A next step may be turning off the water supply. A next step maybe removing the valve flush apparatus from the body of the irrigation valve. A next step maybe reassembling the sprinkler valve. A final step may be testing the irrigation system.

Other features and advantages of the valve flush apparatus and method will become apparent from the following more detailed description, taken in conjunction with the accompanying drawings, which illustrates, by way of example, the principles of the present disclosure.

BRIEF DESCRIPTION OF THE DRAWINGS

Various embodiments and methods will be described and explained with additional specificity and detail through the use of the accompanying drawings in which.

DETAILED DESCRIPTION OF THE PREFERRED EMBODIMENTS

As shown in the drawings and for purposes of illustration, the one or more embodiments disclose herein illustrate a valve flush apparatus generally referred to herein by the reference numeral 10. Furthermore, a method of repairing an irrigation valve made possible by the valve flush apparatus 10 is also disclosed. Generally, the valve flush apparatus 10 may be comprised of a base 12, a stem 14, and a hose 16. The valve flush apparatus 10 is generally configured to be removably attachable and secured to a rim of a body of an irrigation valve 18. Generally, the base 12 may be configured to be removably attachable to a body of an irrigation valve 18 so as to be watertight around a top rim 20 of the body of an irrigation valve 18. The base 12 may be made of a durable plastic material such as ABS plastic, PVC plastic, or some other durable plastic material known in the art. In the alternative, the base 12 may be made of a metal or some other durable material known in the art. The stem 14 may generally be positioned orthogonally to base 12 and may be positioned centrally on the base 12. The stem 14 may be molded as one unit with the base 12, or may be a separate member of the valve flush apparatus 10 which may removably attach to the base 12 so as to be water tight. The stem 14 may also be made of a durable plastic material such as ABS plastic, PVC plastic, or some other durable plastic material known in the art. Alternatively the stem 14 may be made of a metal or other durable material. The stem 14 may be in the form of a tube or pipe which joins with or connects with an aperture 22 in the base 12 so as to form a waterway 38 from the body of an irrigation valve 18 through the base 12 and through the stem 14 of the valve flush apparatus 10.

The valve flush apparatus 10 may further include a hose 16 which may be removably attached to the stem 14. The hose 16 may be a durable rubber, plastic or some other material commonly used in the art for water hoses. Preferably, the material of the hose 16 will be flexible in nature while the material of the base 12 and stem 14 may be rigid in nature.

Figure 1:
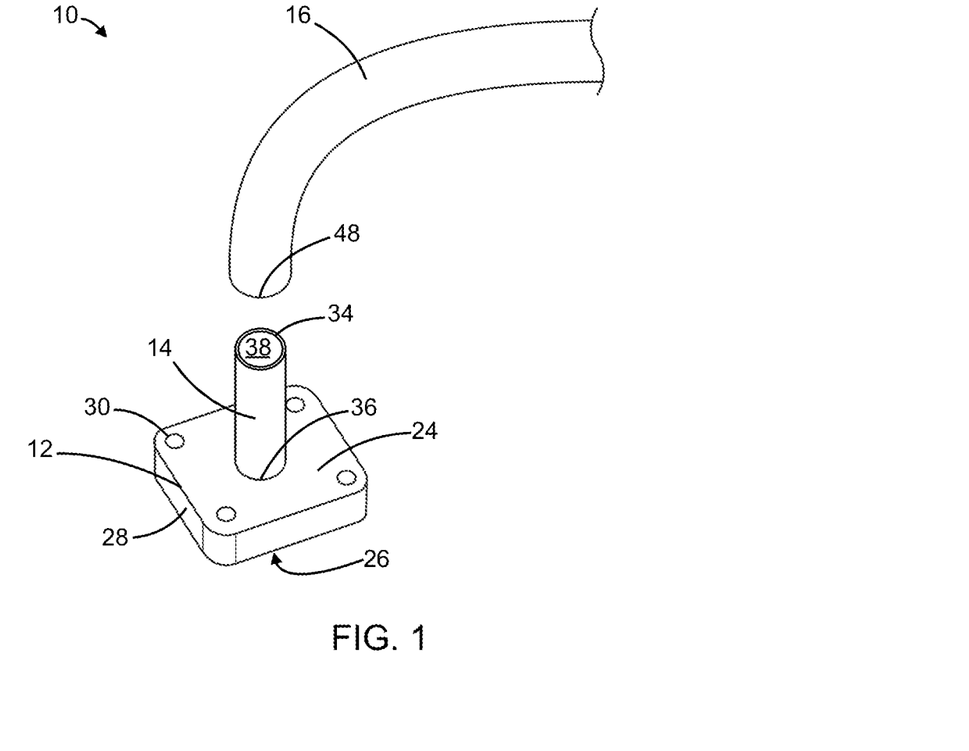
FIG. 1 illustrates a top perspective view of a valve flush apparatus with a hose disconnected.

With reference now to FIG. 1, a top perspective view of an exemplary embodiment of the valve flush apparatus 10 is illustrated. As shown in the figure, the base 12 may be comprised of a top planar surface 24, a bottom planar surface 26, and a thickness 28 between the top planar surface 24 and the bottom planar surface 26. The base 12 may be a solid block such that the top planar surface 24 is directly opposite the bottom planar surface 26 with the thickness 28 between the two surfaces 24 and 26. The surfaces 24, 26 of the base 12 may be shaped as a square, a square with rounded corners, a circle, or some other shape so as to water tightly removably attach to a body 18 of any irrigation valve known in the art. The base 12 may also include a plurality of apertures 30. The plurality of apertures 30 may be positioned so as to pass vertically through the base 12. In addition, the apertures 30 may be positioned through the base 12 so as to align with threaded screw apertures 32 of the body of an irrigation valve 18 to which the base 12 will be removably attached while in use. For example, in one embodiment, the surfaces 24, 26 of the base 12 may be square in shape with the apertures 30 positioned proximate to each corner of the base 12.

As already described above, the stem 14 may be a pipe and may be cylindrical in shape. The stem 14 may be comprised of a first end 34 and a second end 36. The stem 14 may be positioned orthogonally to the base 12 and may be centered on the top planar surface 24 of the base 12. The stem 14 may be molded with the base 12 so as to form one member with the base 12 with the second end 36 of the base 12 being fixed to the top planar surface 24 of the base 12. In the alternative, the stem 14 may be a separate member from the base 12 and may be water tightly removably attachable to the base 12. The first end 34 of the stem 14 may be designed to removably and securely receive the hose 16. For example, the hose 16 may securely slip over the first end 34 of the stem 14.

The valve flush apparatus 10 may include a water passageway 38 such that water may pass through the body of an irrigation valve 18 and through the valve flush apparatus 10 to a desired location chosen by a user. The water passageway 38 of the valve flush apparatus 10 may be defined by the aperture 22 of the base 12, the stem 14 and the hose 16.

Figure 2:
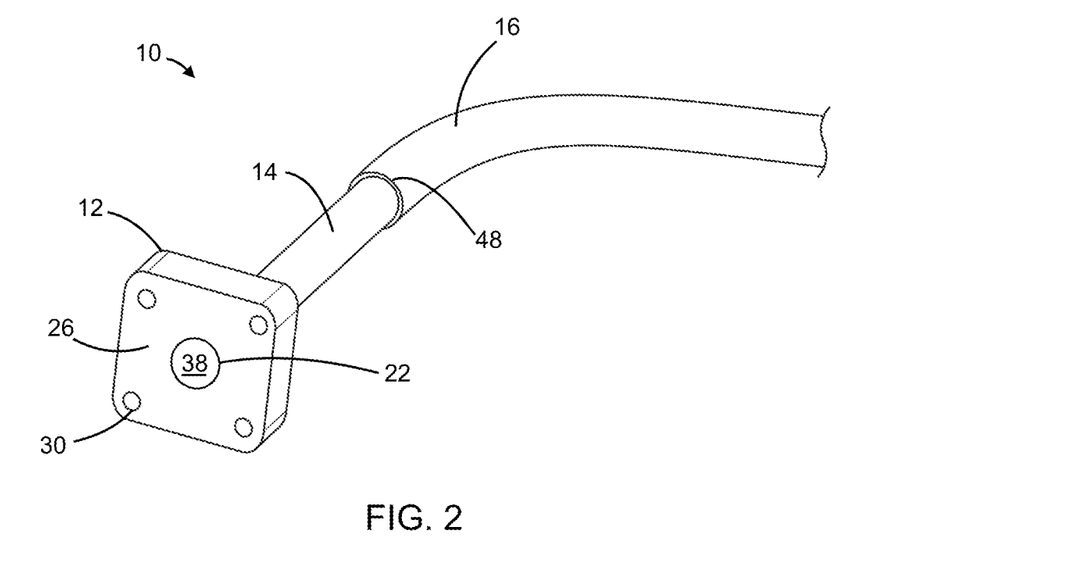
FIG. 2 illustrates a bottom perspective view of the valve flush apparatus of FIG. 1 with the hose connected.

With reference now to FIG. 2, a bottom perspective view of the valve flush apparatus 10 is illustrated. This figure further illustrates the hose 16 removably attached to the stem 14 as described above. In addition, the figure illustrates that the base 12 may further be comprised of an aperture 22 defining a water passageway 38, as described above, which is positioned orthogonally through the surfaces 24, 26 of the base 12. The aperture 22 may further be located centrally through the base 12 so as to align with the stem 14. As described above, the aperture 22 and the stem 14 together may define a water passageway 38 through which water coming through the body of an irrigation valve 18 may pass. The hose 16 may function to extend the waterway 38 defined by the aperture 22 and the stem 14. In different embodiments, the waterway 38 may vary in diameter. For example, in different embodiments of the valve flush apparatus 10, the aperture 22, the stem 14, and the hose 16 may have diameters ranging from half an inch to two inches. However, the diameters of the aperture 22, the stem 14, and the hose 16 are not confined specifically to these sizes.

With reference now to both FIGS. 1 and 2, the figures illustrate that different embodiments of the valve flush apparatus 10 may have stems 14 of differing lengths. In a preferred embodiment, the stem 14 may have a length of at least one inch. However, the stem 14 is not confined to any given length.

Figure 3:
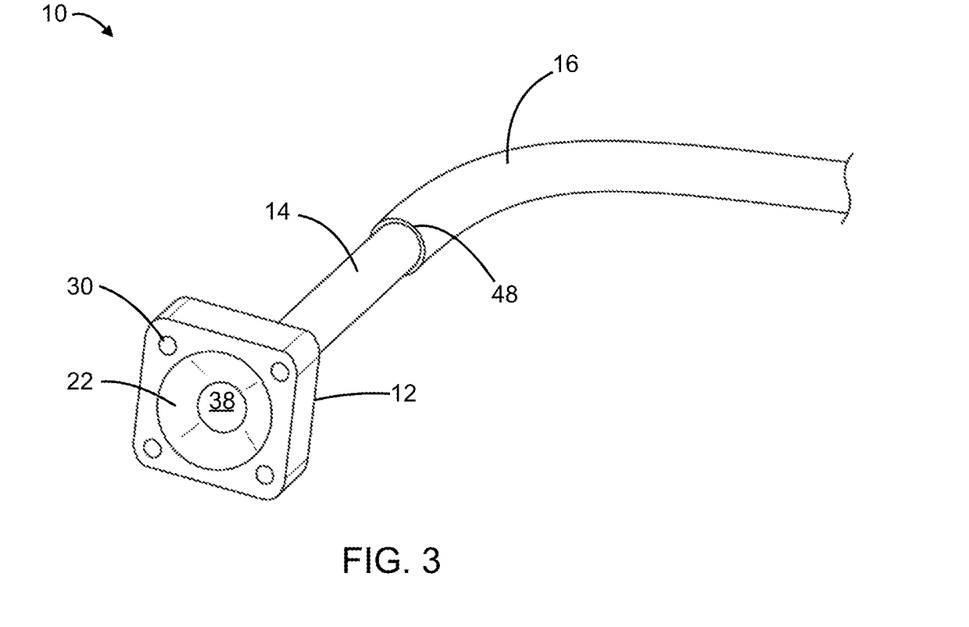
FIG. 3 illustrates a bottom perspective view of an alternative embodiment of the valve flush apparatus of FIGS. 1 and 2.

With reference now to FIG. 3, a bottom perspective view of an alternative embodiment of the valve flush apparatus 10 is illustrated. The figure illustrates that the aperture 22 through the base 12 may be funneled in shape such that the diameter of the aperture 22 is largest at the bottom planar surface 26 of the base 12 and gradually decreases in size from the bottom planar surface 26 to the top planar surface 24 of the base 12. The diameter of the aperture 22 at the top planar surface 24 may be at its smallest. The diameter of the aperture 22 at the top planar surface 24 may be identical in size as the diameter of the water passageway 38 through the stem 14. The funneled shape of the aperture 22 may help to decrease the pressure against the valve flush apparatus 10, when water to the irrigation system is turned on when the valve flush apparatus 10 is attached to the body of an irrigation valve 18.

Figure 4:
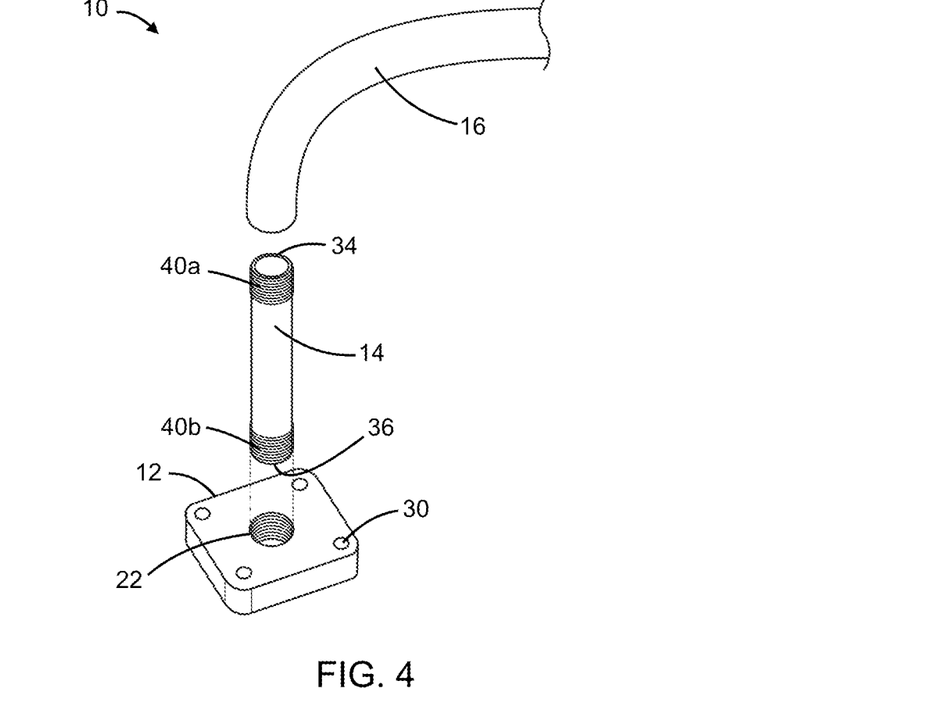
FIG. 4 illustrates an exploded perspective view of another alternative embodiment of the valve flush apparatus of FIGS. 1 and 2.
Figure 5:
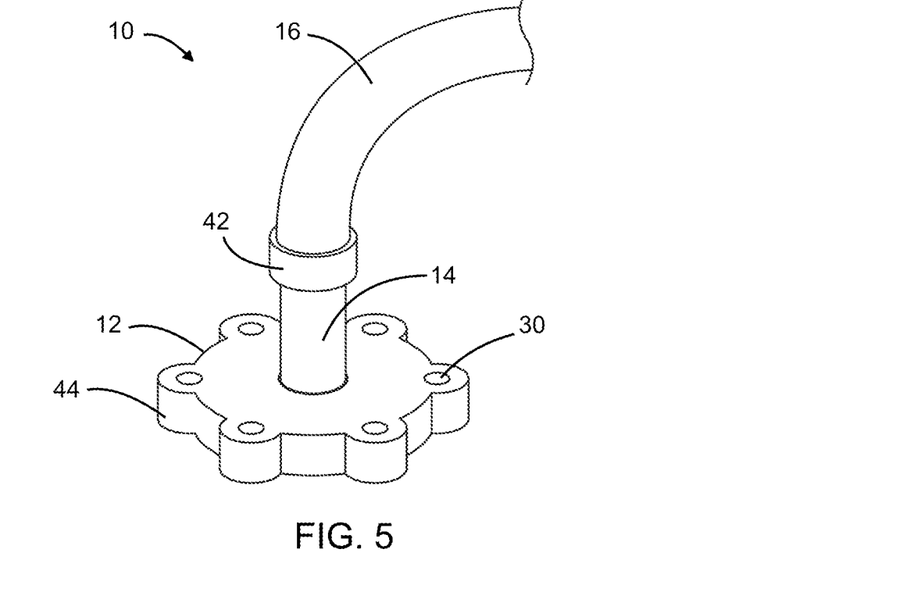
FIG. 5 illustrates a top perspective view of yet another alternative embodiment of the valve flush apparatus of FIGS. 1 and 2.

With reference now to FIG. 4, an exploded perspective view of another alternative embodiment of the valve flush apparatus 10 is illustrated. In this embodiment, the stem 14 may be a separate and independent member of the valve flush apparatus 10 and may be a cylindrical rigid pipe. The first end 34 and the second end 36 may have male threading 40a, 40b on the outside of the stem 14. The aperture 22 of the base 12 may include female threading therein. The male threading 40b of the second end 36 of the stem 14 may water tightly thread into the female threading of the aperture 22 of the base 12. The hose 16 may be a flexible hose that slips over the first end 34 and male threading 40a of the stem 14. In the alternative, as shown in FIG. 5, the hose 16 may have an attached threaded female adapter 42 designed such that the threaded female adapter 42 may water tightly thread over the male threading 40a of the stem 14. In one embodiment, for example, the male threading 40a of the stem 14 may be designed to receive the female threaded end of a standard garden hose known in the art.

With reference now specifically to FIG. 5, a top perspective view of another alternative embodiment of the valve flush apparatus 10 is illustrated showing that the base 12 may vary in shape so as to be removably attachable to the body 18 of any irrigation valve known in the art as discussed above. For example, in one embodiment, the base 12 may be square in shape and have four screw apertures 30 positioned to secure the base 12 to a matching body of an irrigation valve 18. In another embodiment, the base 12 may be generally circular in shape with a plurality of protuberances 44 extending laterally from the base 12. Each protuberance 44 may have an aperture 30 extending vertically therethrough. Thus, the base 12 may be designed to removably attach to the body of an irrigation valve 18 which is circular in shape with similarly situated threaded screw receivers 32. In yet another embodiment, the base 12 may be generally circular in shape with four protuberances 44. Each protrusion 44 may again have a screw aperture 30 extending therethrough. Thus, the base 12 may be designed to removably attach to the body of an irrigation valve 18 which is circular in shape with similarly situated threaded screw receivers 32. Generally, the base 12 may be any shape with any number of screw apertures 30 such that the base 12 may be able to removably attach to the body 18 of any irrigation valve known in the art.

In yet another embodiment, the base 12 of the valve flush apparatus 10 may be configured to removably attach to the body 18 of a jar top irrigation valve. Generally, a jar top irrigation valve includes a body, a bonnet and a female threaded collar. The body of this variety of irrigation valve contains male threading designed to thread into the female threaded collar. The bonnet is placed on top of the body and the collar is used to secure the bonnet to the body. In this embodiment, the base 12 may not contain any screw apertures 30, but may be in the shape to fit over the body 18 of the jar top irrigation valve. The base 12 may be configured such that the preexisting collar may secure the base 12 to the body of the irrigation valve 18. Alternatively, the base 12 may have female threads in the second face 26 such that the base 12 may threadedly attach to the body of the irrigation valve 18. In yet another embodiment, the valve flush apparatus 10 may include a separate collar designed to secure the base 12 to the body of the irrigation valve 18.

Figure 6:
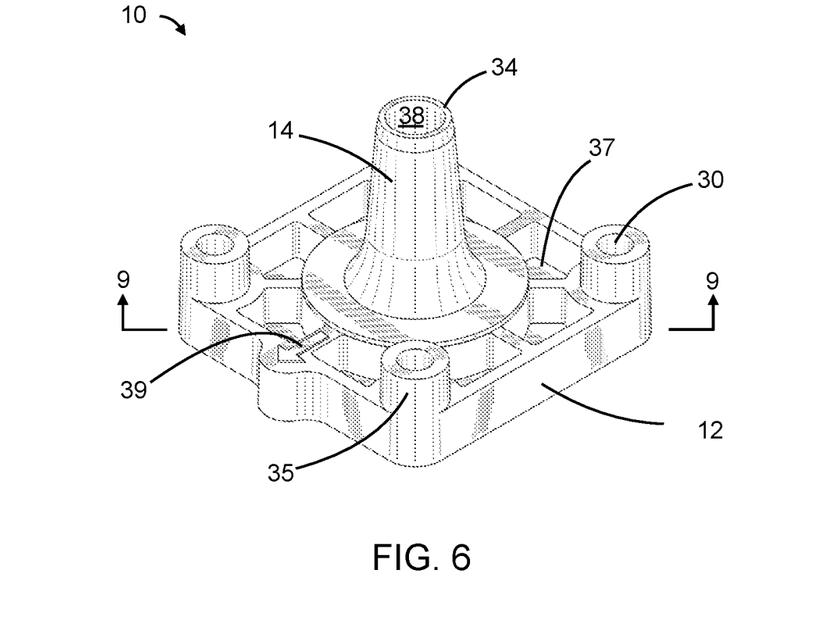
FIG. 6 illustrates a top perspective view of yet another alternative embodiment of the valve flush apparatus of FIGS. 1 and 2.
Figure 7:
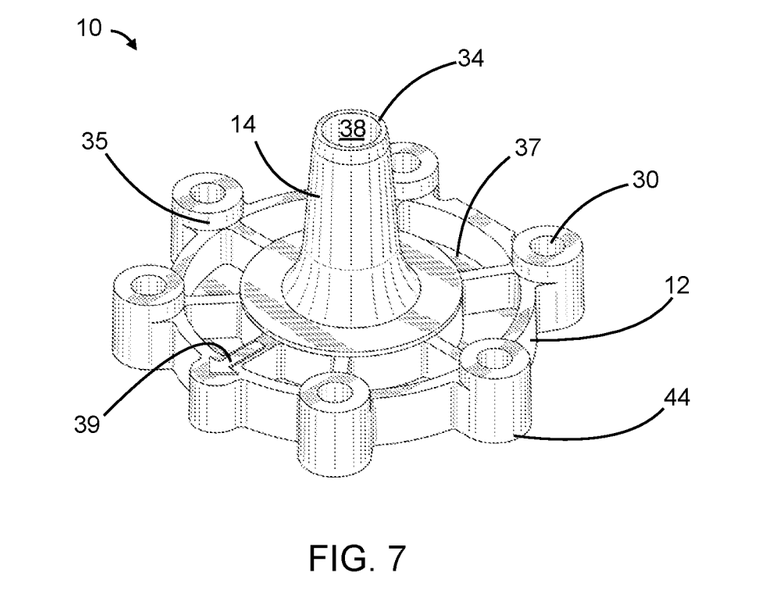
FIG. 7 illustrates a top perspective view of yet another alternative embodiment of the valve flush apparatus of FIGS. 1 and 2.
Figure 8:
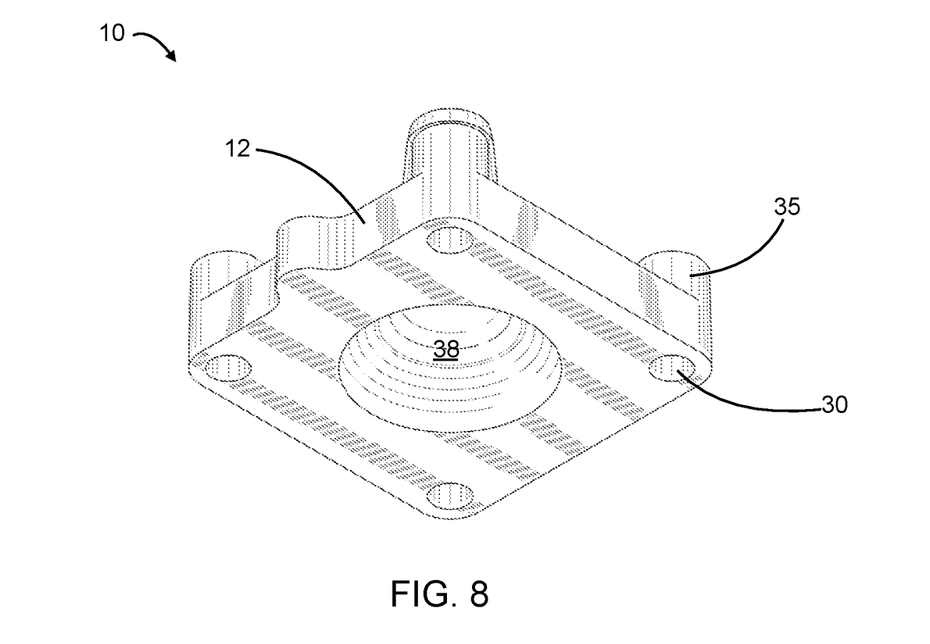
FIG. 8 illustrates a bottom perspective view of the valve flush apparatus of FIG. 6.

With reference now to FIGS. 6-8, alternative embodiments of the valve flush apparatus 10 are shown. In these embodiments, the hollow stem 14 of the valve flush apparatus 10 may be tapered such that the diameter of the hollow stem 14 may be larger at a place where the stem 14 meets the base 12 and may gradually decrease going up the stem to a first end 34 of the stem 14. Additionally, the top planar surface 24 of the base may have a plurality of cavities 37 that extend partially through the thickness 28 of the base 12. The valve flush apparatus may also include screw stems 35 which extend upwardly from the top planar surface 24 of the base 12. The base 12 may further include a directional arrow 39 on the top planar surface 24 which is configured to indicate to a user which direction to removably secure the valve flush apparatus 10 to a body of an irrigation valve 18. Similar to the embodiments already described above, these alternative embodiments may also include a water passageway 38 going through the base 12 and the hollow stem 14.

Figure 9:
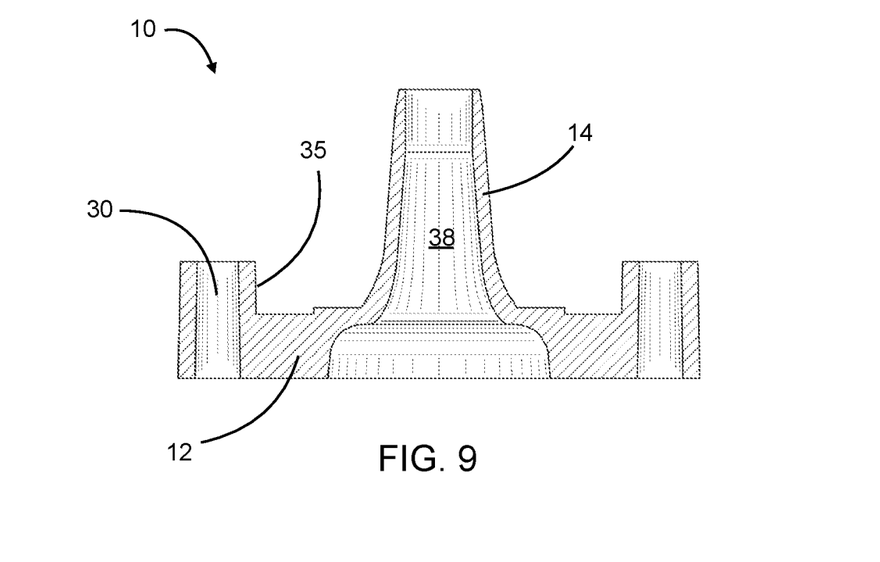
FIG. 9 illustrates a cross-sectional view of the valve flush apparatus of FIGS. 6 and 8 taken along the line through the valve flush apparatus in FIG. 6 numbered 9.

With reference now to FIG. 9, a cross-sectional view of the valve flush apparatus 10 of FIG. 6 is illustrated taken vertically along the line indicated by the numeral 9. The figure illustrates that the water passageway 38 of the base 12 and the water passageway 38 of the hollow stem 14 may be one continuous water passageway 38. The portion of the water passageway 38 in the base 12 may be funneled such that the diameter at the bottom planar surface 26 may be larger than a diameter proximate to the top planar surface 24 such that the diameter of the water passageway 38 in the base 12 may gradually decrease going from the bottom planar surface 26 to the top planar surface 24. The water passageway 38 of the hollow stem 14 may similarly have a larger diameter at a section of the hollow stem 14 proximate to the top planar surface 24 of the base and may gradually decrease until it reaches a top end of the hollow stem 14.

Figure 10:
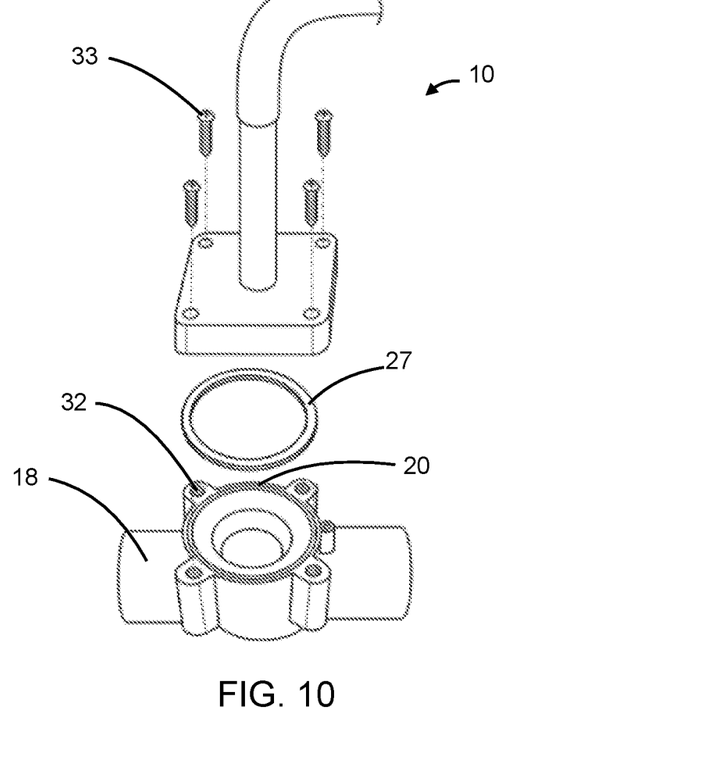
FIG. 10 illustrates a perspective view of how the valve flush apparatus of FIGS. 1 and 2 removably connects to an irrigation valve.

With reference now to FIG. 10, the attachment of the valve flush apparatus 10 to the body of an irrigation valve 18, not of the jar top irrigation valve variety, is illustrated. The figure shows that the base 12 may be designed to fit water tightly over the body of an irrigation valve 18 so as to completely cover a chamber 46 within the body of an irrigation valve 18. The base 12 may further contain a plurality of apertures 30 so as to be identical in number to the number of threaded screw apertures 32 of the body of an irrigation valve 18. Additionally, the plurality of apertures 30 of the base 12 may be positioned so as to align with the threaded screw apertures 32 of the body of an irrigation valve 18 such that the valve flush apparatus 10 may be removably attached to the body of an irrigation valve 18 by screws 33. In an alternative embodiment, a gasket 27 may be included which fits between the bottom planar surface 26 of the base 12 and the rim 20 of the irrigation valve 18. The gasket 27 may provide a hermetic seal when the base 12 is removably secured to the body of the irrigation valve 18. The gasket 27 may be a separate piece from the valve flush apparatus 10 or may be attached to the bottom planar surface 26 of the base 12. The gasket 27 may be in any shape so as to best fit around the rim 20 of the body of the irrigation valve 18. The gasket 27 may further be comprised of a plurality of apertures which may be aligned with the apertures of the base 12.

Figure 11:
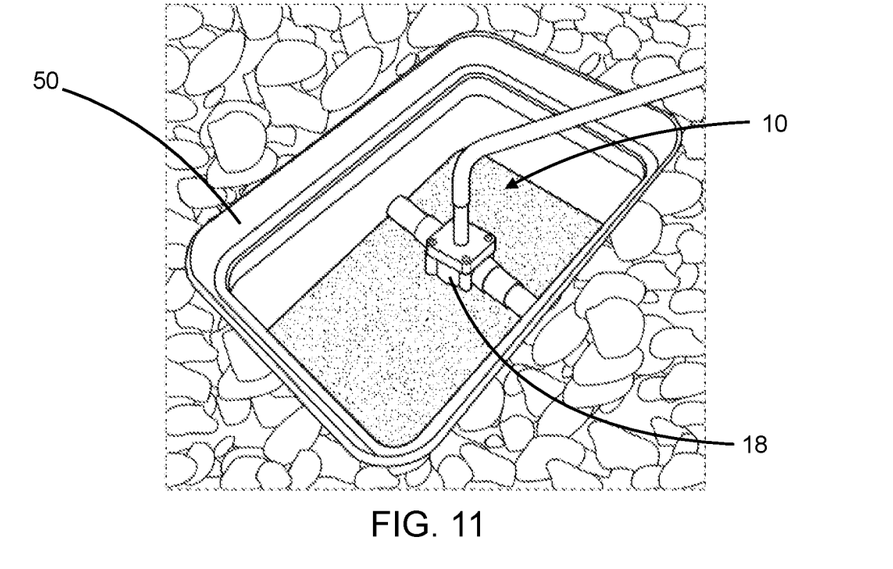
FIG. 11 illustrates an environmental view of the valve flush apparatus removably attached to an irrigation valve in a valve box.

With reference now to FIG. 11, an environmental view of the valve flush apparatus 10 in use is shown. Generally, an underground automatic irrigation system, residential and commercial, known in the art may be comprised of a controller, irrigation valves, piping, sprinkler heads and a backflow preventor. The sprinkler heads are generally organized in zones, which all together, cover a terrain that needs to be irrigated. Generally, the sprinkler heads in a given zone are all connected through piping that connects to a single irrigation valve. This irrigation valve opens and closes based on signals received from the controller. Irrigation valves are often contained in valve boxes. Over time, the irrigation valves may become subject to the buildup of debris within the valve causing the valve to clog. The valve flush apparatus 10 functions to clear debris and/or sediment out of and away from the irrigation valve. As illustrated, the valve flush apparatus 10 may be removably attached to the body of an irrigation valve 18 of an irrigation system which is clogged. A first end 48 of the hose 16 of the valve flush apparatus 10 may be attached to the stem 14 of the valve flush apparatus 10. A second end of the hose 16 may be placed away from the valve box 50 and in an area that will not be hurt by water such as a lawn, garden bed, etc. The irrigation system may then be turned on, allowing water to run through the clogged irrigation valve, through the rim 20 of the body of the irrigation valve 18, through the valve flush apparatus 10, and out of the hose 16 of the valve flush apparatus 10. The flow of water through the irrigation system and valve flush apparatus 10 will push the debris and/or sediment out of the irrigation valve and away from the irrigation valve so that when the irrigation system is shut off, the irrigation valve will be free of debris and/or sediment. This will allow the irrigation valve to again function as intended.

Figure 12:
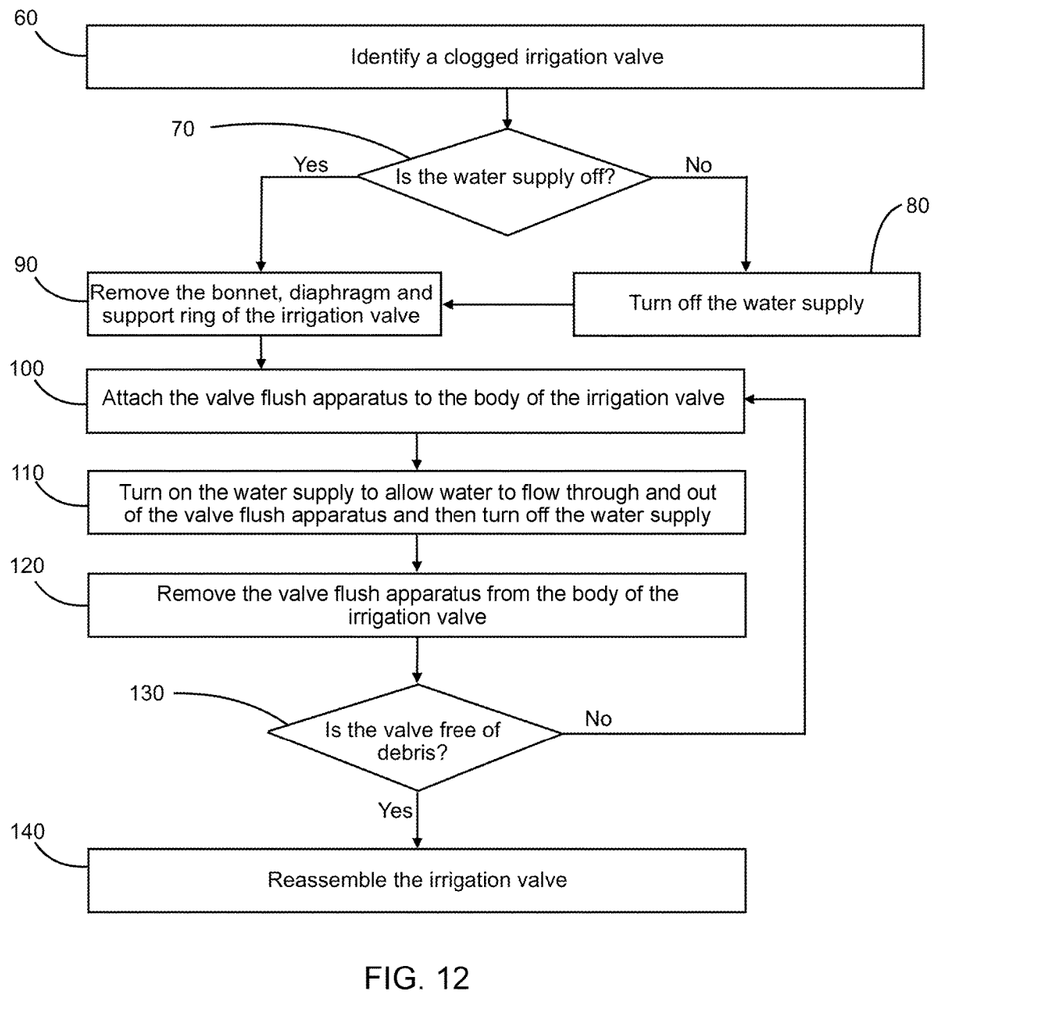
FIG. 12 illustrates a flowchart of a method of repairing an irrigation valve through use of the valve flush apparatus of FIGS. 1-9.

With reference now to FIG. 12, a method of repairing an irrigation valve made possible by the valve flush apparatus 10 is disclosed. The method may include a step 60 of identifying a clogged irrigation valve. This step may be comprised of turning the water supply of the irrigation system on and while all of the zones of the irrigation system are turned off, listening for water flow through the irrigation valves of the system. If any water flow is heard through an irrigation valve, that valve may be marked as possibly having a clog. The irrigation valve may then be opened by removing the bonnet and diaphragm to identify whether or not the irrigation valve is clogged. If there is debris and/or sediment in the irrigation valve, it is clogged and must be flushed free of debris and/or sediment and repaired. Alternatively, all of the irrigation valves in the system may be opened and inspected for debris and/or sediment.

A next step 70 of the method may include determining whether or not the water supply is turned off. If the water supply is not turned off then the water supply must be turned off 80 before proceeding to the third step 90. If the water supply is turned off, the repairmen may move on to the third step 90.

A next step 90 of the method may include opening the irrigation valve by removing the bonnet, diaphragm and support ring of the irrigation valve. In other words, all parts of the irrigation valve should be removed such that the body of the irrigation valve is connected to an incoming irrigation line and an outgoing irrigation line in isolation. At this point, the inside of the body of the irrigation valve may again be inspected for debris and/or sediment to confirm that the irrigation valve is in fact clogged.

A next step 100 of the method may include removably securing the valve flush apparatus 10 to the body of the irrigation valve. Any of the embodiments of the valve flush apparatus 10 described above may be used depending on the type of irrigation valve that needs to be repaired. The embodiment of the valve flush apparatus 10 that matches the irrigation valve that needs to be repaired must be used. When the valve flush apparatus 10 is attached to the body of the irrigation valve, the second end of the hose 16 of the valve flush apparatus 10 may be placed in a position such that water will flow away from the irrigation valve and not fill up the valve box that the irrigation valve is positioned in. Ideally, the second end of the hose 16 would be placed on a lawn or in a garden bed where the water would be put to use in giving extra water to the lawn or garden.

A next step 110 of the method may include turning on the water supply to allow water to flow through and out of the valve flush apparatus 10 and then turning off the water supply. The water may be turned on for a period of about five seconds before it is turned off. By turning on the water supply, water will rush through the irrigation system, through the irrigation valve, through a rim of the irrigation valve, through the valve flush apparatus 10 and out of the hose 16 of the valve flush apparatus 10. The water flow will push the debris and/or sediment out of the irrigation valve, through the valve flush apparatus 10 and deposit the debris and/or sediment wherever the hose 16 of the valve flush apparatus 10 is directed. In this step, it is important that the repairman directs the controller to signal the clogged valve to be in the on position.

A next step 120 of the method may include removing the valve flush apparatus 10 from the body of the irrigation valve. After the valve flush apparatus 10 is removed from the body of the irrigation valve, the repairman may move to a seventh step 130 of the method which may include determining whether or not the irrigation valve is free of debris and/or sediment. To make the determination, the repairmen must look into or feel the inside of the body of the irrigation valve to determine whether or not the valve is free of debris and/or sediment. If the valve is not free of debris and/or sediment, the repairman may repeat steps 100, 110 and 120 as necessary until the debris and/or sediment are cleared from the valve. If the valve is free of debris and/or sediment, the repairman may move on to a next step 140.

The next step 140 may include reassembling the irrigation valve. The reassembling of the irrigation valve may include replacing the support ring, replacing the diaphragm, and replacing the bonnet. A final step may include running the irrigation system to ensure that all of the zones, especially the zone controlled by the irrigation valve just repaired, run properly.

Although several embodiments and methods have been described in detail for purpose of illustration, various modifications may be made without departing from the scope and spirit of the invention. Accordingly, the invention is not to be limited except as by the appended claims.

What is claimed is:

1. A valve flush apparatus, comprising:
a base having a top surface, a bottom surface and a thickness between the top surface and the bottom surface;
a hollow stem extending outwardly from the top surface of the base; and
a water passageway extending through the base and through the hollow stem;
wherein the valve flush apparatus is configured to be removably secured to a rim of a body of an irrigation valve such that the bottom surface of the base is in contact with the rim of the body of the irrigation valve with the hollow stem extending away from the irrigation valve so as to form a water passageway from the irrigation valve, through the rim of the irrigation valve, through the base, and through the hollow stem such that water is released out of the hollow stem.

2. The valve flush apparatus of claim 1, wherein the hollow stem and the base are one solid piece.

3. The valve flush apparatus of claim 1, wherein the base further comprises a plurality of apertures configured to align with a plurality of screw apertures of the body of the irrigation valve and each of the plurality of apertures configured to receive a screw such that the valve flush apparatus may be removably secured through the use of screws to the body of the irrigation valve.

4. The valve flush apparatus of claim 1, wherein the hollow stem is tapered such that the hollow stem has a larger diameter at the top surface of the base and a smaller diameter at a top end of the stem, wherein the diameter of the stem gradually decreases going from the portion of the stem at the top surface of the base to the top end of the stem.

5. The valve flush apparatus of claim 1, further comprised of a flexible hose configured to removably attach to the hollow stem so as to extend the water passageway.

6. The valve flush apparatus of claim 1, wherein the water passageway through the base is funneled such that a diameter of the water passageway at the bottom surface of the base is larger than a diameter of the water passageway at the top surface of the base, wherein the diameter of the water passageway gradually decreases from the bottom surface of the base to the top surface of the base.

7. The valve flush apparatus of claim 1, further comprising a gasket attached to the bottom surface of the base so as to create a water-tight seal between the valve flush apparatus and the body of the irrigation valve when the valve flush apparatus is removably secured to the body of the irrigation valve.

8. A valve flush apparatus, comprising:
a base having a top surface, a bottom surface, and a thickness between the top surface and the bottom surface;
a plurality of protuberances extending laterally from the thickness of the base, each protuberance having an aperture extending vertically through each protuberance;
a hollow stem extending outwardly from the top surface of the base; and
a water passageway extending through the base and through the hollow stem;
wherein the plurality of protuberances are configured to align with a plurality of screw apertures of a body of a irrigation valve such that the valve flush apparatus may be removably secured through the use of screws to a body of the irrigation valve such that the bottom surface of the base is in contact with a rim of the body of the irrigation valve with the hollow stem extending away from the irrigation valve so as to form a water passageway from the irrigation valve, through the rim of the irrigation valve, through the base, and through the hollow stem such that water is released out of the hollow stem.

9. The valve flush apparatus of claim 8, further comprised of a flexible hose configured to removably attach to the hollow stem so as to extend the water passageway.

10. The valve flush apparatus of claim 8, further comprised of a plurality of cavities in the top surface of the base and extending partially through the thickness of the base.

11. The valve flush apparatus of claim 8, wherein the hollow stem is tapered such that the hollow stem has a larger diameter at the top surface of the base and a smaller diameter at a top end of the stem, wherein the diameter of the stem gradually decreases going from the portion of the stem at the top surface of the base to the top end of the stem.

12. The valve flush apparatus of claim 8, wherein the water passageway through the base is funneled such that a diameter of the water passageway at the bottom surface of the base is larger than a diameter of the water passageway at the top surface of the base, wherein the diameter of the water passageway gradually decreases from the bottom surface of the base to the top surface of the base.

13. The valve flush apparatus of claim 8, further comprising a gasket attached to the bottom surface of the base so as to create a water-tight seal between the valve flush apparatus and the body of the irrigation valve when the valve flush apparatus is removably secured to the body of the irrigation valve.

14. The valve flush apparatus of claim 8, wherein the hollow stem may be a separate component of the valve flush apparatus from the base and wherein the hollow stem may removably attach to the base.

15. A method of clearing debris from an irrigation valve, the method comprising the steps of:
determining whether a water supply to the irrigation valve is turned off and if it is not, turning off the water supply to the irrigation valve;
disassembling the irrigation valve by removing all parts of the irrigation valve such that a body of the irrigation valve is connected to an incoming irrigation line and an outgoing irrigation line in isolation;
removably attaching a valve flush apparatus comprising a water passageway to the body of the irrigation valve such that a water passageway is created from the body of the irrigation valve and through the valve flush apparatus;
turning on the water supply such that water runs through the body of the irrigation valve and through the valve flush apparatus;
turning off the water supply;
removing the valve flush apparatus from the body of the irrigation valve; and
reassembling the irrigation valve.

16. The method of claim 15, wherein the valve flush apparatus is further comprised of a base and a hollow stem extending outwardly from the body, wherein the valve flush apparatus is removably attached to the body of the irrigation valve by removably attaching the base to a rim of the body of the irrigation valve with the hollow stem extending away from the irrigation valve.

17. The method of claim 15, further comprising removably attaching a hose to the valve flush apparatus so as to extend the water passageway after the step of removably attaching the valve flush apparatus and prior to the step of turning on the water supply.

18. The method of claim 15, further comprising the step of waiting at least five seconds after turning on the water supply and prior to turning off the water supply.

19. The method of claim 15, further comprising the step of checking inside the body of the irrigation valve to determine if it is free of debris directly after removing the valve flush apparatus from the body of the irrigation valve and if it is free of debris, continuing on with the step of reassembling the irrigation valve, and if it is not free of debris, repeating the steps of removably attaching the valve flush apparatus to the body of the irrigation valve, turning on the water supply, turning off the water supply, removing the valve flush apparatus, and checking inside the body of the irrigation valve until the body of the irrigation valve is free of debris.

20. The method of claim 19, further comprising the step of waiting at least five seconds directly in-between the steps of turning on the water supply and turning off the water supply.

\* \* \* \* \*